W. NORRIS.
HEATER.
APPLICATION FILED JUNE 1, 1908.

907,863.

Patented Dec. 29, 1908.
2 SHEETS—SHEET 1.

WITNESSES.

INVENTOR.
WILLIAM NORRIS

W. NORRIS.
HEATER.
APPLICATION FILED JUNE 1, 1908.

907,863.

Patented Dec. 29, 1908.

2 SHEETS—SHEET 2.

WITNESSES.

INVENTOR.
WILLIAM NORRIS

UNITED STATES PATENT OFFICE.

WILLIAM NORRIS, OF TORONTO, ONTARIO, CANADA, ASSIGNOR OF ONE-HALF TO MURRAY HAMILTON WILLIAMS, OF OAKVILLE, CANADA.

HEATER.

No. 907,863.        Specification of Letters Patent.        Patented Dec. 29, 1908.

Application filed June 1, 1908. Serial No. 435,897.

*To all whom it may concern:*

Be it known that I, WILLIAM NORRIS, of the city of Toronto, in the county of York, in the Province of Ontario, Canada, have invented certain new and useful Improvements in Heaters, of which the following is the specification.

My invention relates to improvements in heaters adaptable for steam or hot water heating, and the object of the invention is to devise a form of heater, which will with but a small fire generate steam or hot water and by heating up but a small quantity of water in the heater.

A further object is to produce steam or hot water economically and with rapidity.

A still further object is to so run the heater that in mild weather only a minimum amount of fuel will be required.

A yet further object is to make the heater of such a form as will prevent lodgment of soot, or make the heater self cleansing.

To effect these objects I have constructed my heater with a fire pot having a suitable heat non-conducting wall, such fire pot converging to the top to an opening for the products of combustion, a surrounding ring located at the bottom of the fire pot and a series of upwardly extending pipes from the ring converging near the top into a common outlet, which extends through the outlet in the fire pot for the products of combustion, a casing surrounding the fire pot and provided at one side with a smoke flue, a series of rings surrounding the outlet and located between the top of the fire pot casing and the outer casing, a head communicating with the ring at the bottom of the fire pot and pipes connecting the head to the surrounding rings and outlet, the outlet being designed to convey steam to the different radiators through the building and a return pipe being provided into one of the rings above the fire pot and the parts being arranged and constructed in detail as hereinafter more particularly explained.

Figure 1:
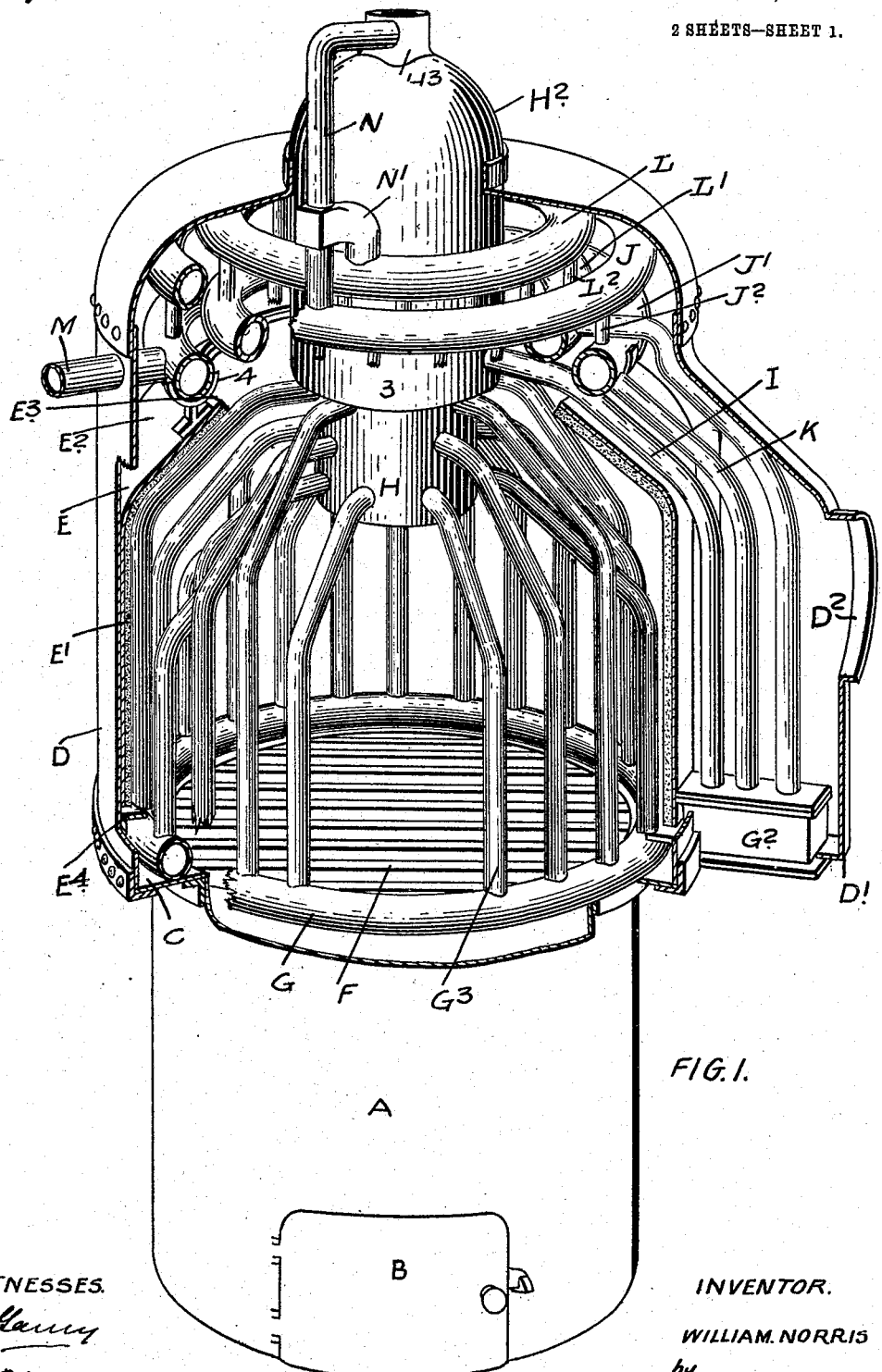
Figure 2:
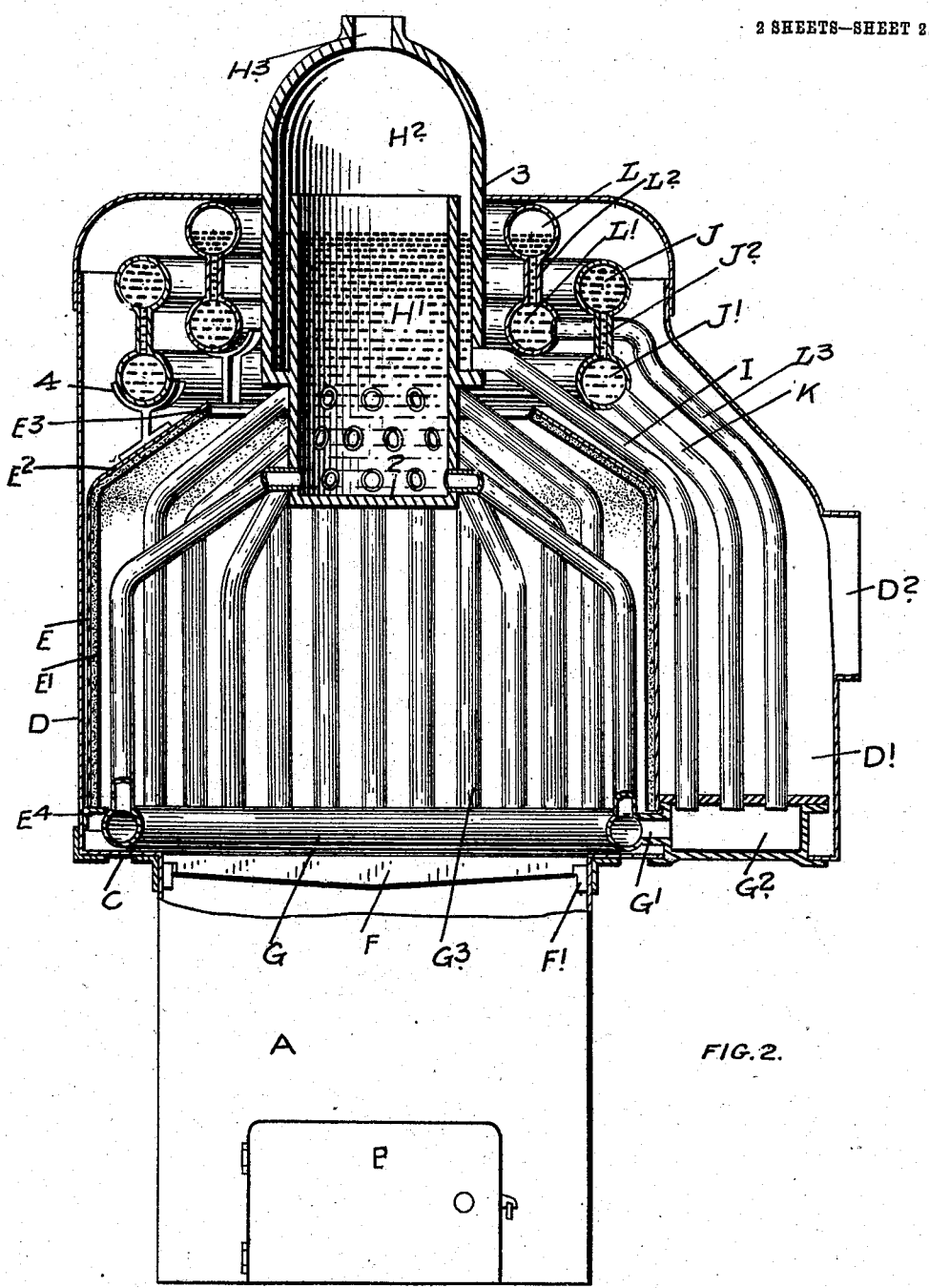

Figure 1, is a perspective view of my improved steam or hot water heater or boiler with the outer casing and fire pot casing broken away and in section. Fig. 2, is a vertical section.

In the drawings like letters of reference indicate corresponding parts in each figure.

A is the base casting in which is located the ash pit door B.

C is a flange extending outwardly from the top of the base casting and D is the outer casing, which extends upwardly from the flange C.

E is the fire pot casing, which may be made of steel or any other suitable material and preferably provided with a heat non-conducting lining E'. The material of which the fire pot is constructed may be of any suitable material, such as fire brick. The top of the fire pot converges at $E^2$ to an opening $E^3$. The bottom of the fire pot is supported on an annular angle iron $E^4$ or in any other suitable manner.

F are the bars of the grate, which are supported in the usual manner on a supporting ring F'.

G is a tubular ring, which is connected by a passage-way G' to a head $G^2$, which extends outwardly from the fire pot casing into an enlargement D' of the outer casing. The enlargement D' is provided with a flue opening $D^2$ through which pass the products of combustion.

$G^3$ are upwardly extending pipes, which converge at different levels and enter into the outlet chamber H within the fire pot and near the top of the same. The outlet chamber is formed cylindrical at the bottom portion H' into which the pipes $G^3$ extend and is provided with a suitable bottom 2. Intermediate of the length of the portion H' the outlet chamber extends laterally and upwardly in substantially cylindrical shape as at 3 to the dome $H^2$.

$H^3$ is the outlet from the dome through which the steam is designed to pass to the radiators of the building.

I is a pipe or tube leading from the bottom of the cylindrical portion 3 of the outlet into the head $G^2$.

J and J' are annular tubes or rings connected together by the vertical pipes $J^2$. The bottom ring J' is supported by brackets 4 or other suitable means upon the top of the fire pot casing.

K is a pipe leading from the lower tube J' to the head $G^2$.

L and L' are tubular rings of less diameter than the rings J and J' and located closer to the outlet H. The rings L and L' are connected by the vertical pipes L² and the ring L' is connected by the pipe L³ to the head G². The pipes I K and L³ it will be noticed are all located on the path of the products of combustion to the smoke flue.

M is the return pipe, which extends into the ring J'.

N is an equalizing pipe, which extends into the outlet H³ and into the pipe J' at the bottom and by a branch N' into the pipe J.

Having now described the principal parts involved in my invention I shall briefly describe its operation and utility.

The water in the pipes G and G³ and lower portion H' of the outlet is heated directly by the fire, so that any steam arising from the portion H' will pass immediately out through the outlet H³ to the building. The level of the water in the pipes is indicated. Any boiling over of the water in the portion H' of the outlet will only overflow the portion H' and pass into the annular space surrounding it and serve to heat the water on its passage to the head G². The products of combustion pass around the lower portion H' and among the pipes G³ passing outwardly through the outlet at the top of the fire pot, thence around the rings L L' pipes L² J and J' and pipe J² and thence along the pipes I K L³ to the flue D², thus insuring to the greatest extent possible the benefit of the products of combustion on the aforesaid pipes I by heating the water as it passes to the head G².

It will now be seen from this description that it is not necessary in order to generate steam to heat all the water in the boiler but steam may be generated by a small fire in the pipes G³ and portion H' of the outlet from which the steam will arise and circulate. The products of combustion are also utilized to a maximum extent. In case I use the heater for hot water I would, of course, reduce the height of the outlet, in fact take away the dome H² altogether. In case, however, I use my boiler for steam power I would make the upper pipes J or pipes similarly situated larger in proportion. The heater may be also with facility arranged in oblong form and various changes may be made in the arrangement of the pipes without departing from the spirit of my invention. I wish also to draw attention to the superior construction, which I have adopted above the fire pot, which allows of the gases burning freely around the rings. In other constructions the gases are smothered to a great extent and pass out through the smoke flue without being consumed. It will also be seen from this description that I am enabled by my construction of heater to present a maximum surface to the direct action of the fire.

What I claim as my invention is:

1. In a steam or hot water heater, the combination with the fire pot having a suitable heat non-conducting wall and a central opening, of a ring surrounding the bottom of the fire pot, pipes extending upwardly from the ring, a central outlet chamber into which such pipes extend through the central opening of the fire pot, a dome extending from the outside of the central outlet chamber and forming an annular chamber around the same, an outer casing having a flue opening at one side thereof and a pipe leading from the annular chamber surrounding the outlet chamber downwardly and a head communicating with the ring at the bottom of the fire pot and into which such pipe extends as and for the purpose specified.

2. In a steam or hot water heater, the combination with the fire pot having a suitable heat non-conducting wall and a central opening, of a tubular ring surrounding the bottom of the fire pot, pipes extending upwardly from the ring, a central outlet chamber into which such pipes extend through the central opening of the fire pot, a dome extending from the outside of the central outlet chamber and forming an annular ring around the same, an outer casing having a flue opening at one side thereof and a pipe leading from the annular chamber surrounding the outlet chamber downwardly and a head communicating with the ring at the bottom of the fire pot and into which such pipe extends, a ring surrounding the dome and located in the path of the products of combustion and a pipe connecting the ring to the head as and for the purpose specified.

3. In a steam or hot water heater, the combination with the fire pot having a suitable heat non-conducting wall and a central opening, of a tubular ring surrounding the bottom of the fire pot, pipes extending upwardly from the ring, a central outlet chamber into which such pipes extend through the central opening of the fire pot, a dome extending from the outside of the central outlet chamber and forming an annular ring around the same, an outer casing having a flue opening at one side thereof and a pipe leading from the annular chamber surrounding the outlet chamber downwardly and a head communicating with the ring at the bottom of the fire pot and into which such pipe extends, a plurality of rings connected together by vertical pipes and pipes extending from the lowermost rings to the head as and for the purpose specified.

4. The combination with the fire pot and central outlet chamber and pipes located in the fire pot communicating with the outlet chamber, of a plurality of rings surrounding the outlet chamber, a dome for the outlet chamber, an equalizing pipe communicating with the rings and top of the dome and a suitable return pipe extending into one of the rings as and for the purpose specified.

5. In a steam or hot water heater, the combination with the fire pot having a suitable wall and central opening, of a water chamber surrounding the fire pot pipes extending upwardly from the water chamber, a central outlet chamber at the top of the fire pot into which such pipes extend, a head communicating with the water chamber at the bottom of the fire pot, an outer casing, a water chamber located in the outer casing and a pipe connecting such water chamber to the head as and for the purpose specified.

WILLIAM NORRIS.

Witnesses:
B. BOYD,
R. COBAIN.